US012661968B2

(12) United States Patent
Öjergren et al.

(10) Patent No.: US 12,661,968 B2
(45) Date of Patent: Jun. 23, 2026

(54) HEAVY-DUTY VEHICLE BATTERY SUSPENSION SYSTEM COMPRISING A PYROTECHNICAL FASTENER

(71) Applicant: Volvo Truck Corporation, Gothenburg (SE)

(72) Inventors: Johan Öjergren, Kungälv (SE); Kenny Leandersson, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 345 days.

(21) Appl. No.: 18/521,608

(22) Filed: Nov. 28, 2023

(65) Prior Publication Data

US 2024/0198846 A1 Jun. 20, 2024

(30) Foreign Application Priority Data

Dec. 16, 2022 (EP) .................................... 22214248

(51) Int. Cl.
*B60K 1/04* (2019.01)
*B60L 50/60* (2019.01)
*F16B 31/00* (2006.01)
(52) U.S. Cl.
CPC ........ *B60K 1/04* (2013.01); *B60K 2001/0472* (2013.01); *B60L 50/66* (2019.02); *F16B 31/005* (2013.01)
(58) Field of Classification Search
CPC .. F16B 31/005; B60L 50/60–66; B60L 53/80; Y02T 10/70; H01M 50/249; H01M 2220/20; B60R 16/04; B60K 1/04–2001/0494; B60K 6/28
See application file for complete search history.

(56) References Cited

U.S. PATENT DOCUMENTS

| | | | | |
|---|---|---|---|---|
| 11,154,765 | B1 * | 10/2021 | Pantazelos | ......... A63C 9/08521 |
| 11,904,704 | B2 * | 2/2024 | Jang | ...................... B60L 3/0007 |
| 12,145,431 | B2 * | 11/2024 | Wassmur | .................. B60L 3/04 |
| 2018/0159110 | A1 | 6/2018 | Tuomola | |
| 2020/0384882 | A1 | 12/2020 | Falls et al. | |

(Continued)

FOREIGN PATENT DOCUMENTS

| | | | | |
|---|---|---|---|---|
| CN | 110034259 A | * | 7/2019 | .............. B60L 50/66 |
| CN | 114919430 A | * | 8/2022 | .............. B60L 50/66 |

(Continued)

OTHER PUBLICATIONS

Extended European Search Report for European Patent Application No. 22214248.1, mailed Jun. 2, 2023, 9 pages.

*Primary Examiner* — James J Taylor, II
(74) *Attorney, Agent, or Firm* — Withrow & Terranova, PLLC

(57) ABSTRACT

A heavy-duty vehicle battery suspension system for releasably holding a rechargeable traction battery in an electric heavy-duty vehicle, wherein the heavy-duty vehicle battery suspension system comprises a pyrotechnical fastener, wherein the heavy-duty vehicle battery suspension system is configured to release the traction battery if the pyrotechnical fastener is triggered, and wherein the heavy-duty vehicle battery suspension system is configured such that the pyrotechnical fastener may be manually triggered. A method for releasing a rechargeable traction battery from an electric heavy-duty vehicle is also disclosed.

17 Claims, 2 Drawing Sheets

(56) References Cited

U.S. PATENT DOCUMENTS

| 2022/0169126 | A1 | | 6/2022 | Borghi et al. | |
| 2022/0363143 | A1 | | 11/2022 | Faruque et al. | |
| 2024/0317062 | A1 | * | 9/2024 | Guzman-Magana | ..... B60L 3/04 |

FOREIGN PATENT DOCUMENTS

| DE | 102011120960 | A1 | * | 4/2013 | ............... | B60K 1/04 |
| DE | 102012105298 | A1 | * | 12/2013 | ............... | B60K 1/04 |
| DE | 102014016185 | A1 | | 5/2016 | | |
| DE | 202017001021 | U1 | | 5/2018 | | |
| DE | 102018009106 | A1 | * | 5/2019 | ............... | B60K 1/04 |

* cited by examiner

HEAVY-DUTY VEHICLE BATTERY SUSPENSION SYSTEM COMPRISING A PYROTECHNICAL FASTENER

PRIORITY APPLICATIONS

The present application claims priority to European Patent Application No. 22214248.1, filed on Dec. 16, 2022, and entitled "HEAVY-DUTY VEHICLE BATTERY SUSPEN-SION SYSTEM COMPRISING A PYROTECHNICAL FASTENER," which is incorporated herein by reference in its entirety.

TECHNICAL FIELD

The disclosure relates generally to heavy-duty vehicle battery suspension. In particular aspects, the disclosure relates to a heavy-duty vehicle battery suspension system comprising a pyrotechnical fastener and to a method for releasing a rechargeable traction battery from an electric heavy-duty vehicle. The disclosure can be applied in electric heavy-duty vehicles, such as electric trucks, electric buses, and/or electric construction equipment.

BACKGROUND

Electrified vehicles (EV) are a vital part of transportation and handling for the future. The number of electrical vehicles is therefore growing rapidly and, hence, a greater risk for an electric vehicle being involved in an incident exists. The traction batteries for electric vehicles are very safe, however, in some rare circumstances where an emergency incident occurs there might be a risk for all involved. Hence, there is a need for providing a system enabling rapid dismounting of the traction battery from the electric vehicle either after an incident and/or during handling or repair of the electric vehicle.

SUMMARY

According to a first aspect of the disclosure, there is provided a heavy-duty vehicle battery suspension system for releasably holding a rechargeable traction battery in an electric heavy-duty vehicle, wherein the heavy-duty vehicle battery suspension system comprises a pyrotechnical fas-tener, wherein the heavy-duty vehicle battery suspension system is configured to release the traction battery if the pyrotechnical fastener is triggered, and wherein the heavy-duty vehicle battery suspension system is configured such that the pyrotechnical fastener may be manually triggered. The first aspect of the disclosure may seek to solve the above mentioned disadvantages and especially a system for dis-mounting or releasing a traction battery of the electric heavy-duty vehicle. A technical benefit may include that the pyrotechnical fastener may be triggered manually whereby the traction battery is released from the electric heavy-duty vehicle. After the traction battery has been released, the electric heavy-duty vehicle alone, without the traction bat-tery, may in some instances be transported to a garage or repair shop. The released traction battery may in some instances be immersed in liquid, such as water, to hinder ignition of re-ignition thereof.

By the expression manually triggered is meant that an operator, i.e. a human being, may trigger the pyrotechnical fastener. The present disclosure does not exclude that the heavy-duty vehicle battery suspension system may be con-figured such that the pyrotechnical fastener in addition may be automatically triggered, e.g., by a collision detection system of the electric heavy-duty vehicle. The operator that manually triggers the pyrotechnical fastener is typically a first responder. A first responder may e.g., be a fire fighter, a police officer or paramedics.

In some examples, the heavy-duty vehicle battery sus-pension system may comprise a trigger device for triggering the pyrotechnical fastener. A technical benefit may include that the trigger device may be activated manually by the operator.

In some examples, the trigger device may be configured to trigger the pyrotechnical fastener by an electric potential, for example an operator connecting an electric cable of the trigger device to an electric energy source. The electric energy source may typically be a battery, such as a 12 volt battery, or a so called jump-start booster. A technical benefit may include that the trigger device first may be activated by connecting the electric cable to the electric energy source so that the pyrotechnical fastener is not unintendedly activated. The operator may have the electric energy source, or the electric energy source may be arranged at an opposite end of the cable compared to the pyrotechnical fastener easily accessible for the operator.

In some examples, a contact member may be arranged between the electric cable and the electric energy source for connecting the electric energy source to the electric cable by activation of the contact member so that the pyrotechnical fastener is triggered. A technical benefit may include that the electric energy source and the electric cable may be con-nected in an easy manner for providing the electric potential to the pyrotechnical fastener.

In some examples, the trigger device may comprise an electric cable that may be electrically connected to the pyrotechnical fastener. A technical benefit may include that the pyrotechnical fastener may easily be triggered.

In some examples, the trigger device may be hidden during normal operation of the electric heavy-duty vehicle. A technical benefit may include that the trigger device is not activated unintentionally, or as a sabotage.

In some examples, a proximal end of the electric cable may be electrically connected to the pyrotechnical fastener and a distal end of the electric cable may be accessible to an operator through an opening of the electric heavy-duty vehicle, wherein said opening may be configured to be closed during normal operation of the electric heavy-duty vehicle. A technical benefit may include that access to the electric cable and thereby the trigger device is facilitated, and at the same time that the distal end of the electric cable is hidden so that it is protected and invisible during normal operation of the electric heavy-duty vehicle.

In some examples, a proximal end of the electric cable may be electrically connected to the pyrotechnical fastener and a distal end of the electric cable may be accessible to an operator through a tow eye opening of the electric heavy-duty vehicle. A technical benefit may include that access to the electric cable and thereby the trigger device is facilitated, and at the same time that the distal end of the electric cable is hidden so that it is protected and invisible during normal operation of the electric heavy-duty vehicle.

In some examples, a proximal end of the electric cable may be electrically connected to the pyrotechnical fastener and a distal end of the electric cable may be accessible to an operator through a side marking lamp of the electric heavy-duty vehicle. A technical benefit may include that access to the electric cable and thereby the trigger device is facilitated, and at the same time that the distal end of the electric cable is hidden so that it is protected and invisible during normal operation of the electric heavy-duty vehicle. The side marking lamp may be accessible even after a head-on collision. In addition, it is ensured that the distal end of the electric cable not is activated unintentionally.

In some examples, the heavy-duty vehicle battery suspension system may comprise at least two separate trigger devices, each may be configured to independently trigger the pyrotechnical fastener. A technical benefit may include that the pyrotechnical fastener may be triggered even in circumstances where one of the trigger devices is not accessible. In such a circumstance the other trigger device may be used. Hence, a trigger device redundancy is obtained providing an increased reliability of the system.

In some examples, the pyrotechnical fastener may mechanically connect the rechargeable traction battery to the electric heavy-duty vehicle. A technical benefit may include that when the pyrotechnical fastener is triggered, the mechanical connection between the traction battery and the electric heavy-duty vehicle may be removed whereby the traction battery may be released from the electric heavy-duty vehicle.

In some examples, the pyrotechnical fastener may extend through a vehicle fixation bracket of the electric heavy-duty vehicle and through a battery bracket of the rechargeable traction battery. A technical benefit may include that a reliable connection may be facilitated and at the same time it is ensured that the traction battery may be released by triggering the pyrotechnical fastener.

In some examples, the traction battery may be held to the electric heavy-duty vehicle at a number of suspension points, and a pyrotechnical fastener may be arranged at each suspension point. A technical benefit may include that the traction battery may be released at every suspension point. Hereby, release of the traction battery may be facilitated.

In some examples, a central suspension point may be arranged for holding the traction battery to the electric heavy-duty vehicle, and wherein a pyrotechnical fastener may be arranged in connection with the central suspension point. A technical benefit may include that fewer pyrotechnical fasteners are required, such as only a single pyrotechnical fastener.

In some examples, a number of suspension points may be connected with the central suspension point.

In some examples, the heavy-duty vehicle battery suspension system may comprise a front pyrotechnical fastener and a rear pyrotechnical fastener. A technical benefit may include that the traction battery may be released at every suspension point. Hereby, release of the traction battery may be facilitated.

In some examples, the heavy-duty vehicle battery suspension system may comprise a front left, a front right, a rear left and a rear right pyrotechnical fastener. A technical benefit may include that the traction battery may be released at every suspension point. Hereby, release of the traction battery may be facilitated.

According to a second aspect of the disclosure, an electric heavy-duty vehicle energy supply system may comprise the heavy-duty vehicle battery suspension system as mentioned above and a rechargeable traction battery.

According to a third aspect of the disclosure, an electric heavy-duty vehicle may comprise a heavy-duty vehicle battery suspension system as mentioned above or an electric heavy-duty vehicle energy supply system as mentioned above.

According to a fourth aspect of the disclosure a method for releasing a rechargeable traction battery from an electric heavy-duty vehicle may comprise providing a heavy-duty vehicle battery suspension system as mentioned above, arranging a pyrotechnical fastener in the heavy-duty vehicle battery suspension system, triggering the pyrotechnical fastener manually for releasing the traction battery from the electric heavy-duty vehicle. The electric heavy-duty vehicle may comprise a heavy-duty vehicle battery suspension system as mentioned above or an electric heavy-duty vehicle energy supply system as mentioned above.

In some examples, the triggering of the pyrotechnical fastener may be performed by connecting the pyrotechnical fastener via one or more cables to an electric energy source.

In some examples, the connecting of the cables to the electric energy source may be performed by pulling an end of the cables out of an opening of the electric heavy-duty vehicle before connecting the end of the cables to the electric energy source.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

With reference to the appended drawings, below follows a more detailed description of aspects of the disclosure cited as examples.

FIG. 2 further illustrates a method for releasing a rechargeable traction battery from an electric heavy-duty vehicle.

DETAILED DESCRIPTION

Aspects set forth below represent the necessary information to enable those skilled in the art to practice the disclosure.

Since the number of electric vehicles, such as an electric heavy-duty vehicle, is growing rapidly there is a greater risk for an electric vehicle being involved in an incident such as a collision. The electric heavy-duty vehicle is powered by one or more traction batteries. These traction batteries are very safe, however in some rare circumstances where an emergency incident occurs there might be a risk for all involved. This risk may be a leak from the traction battery and/or a fire risk if the traction battery ignites, e.g., after a so called thermal runaway. Accordingly, it is desirable to be able to release the traction battery from the electric heavy-duty vehicle after an incident for minimizing the risk with the traction battery. Also, it may be relevant to release the traction battery during repair such as at a garage, especially in circumstances where the electric heavy-duty vehicle has been involved in an incident and the traction battery has not been released at the site of the incident. The disclosure relates to overcoming and/or alleviating these disadvantages.

Figure 1:
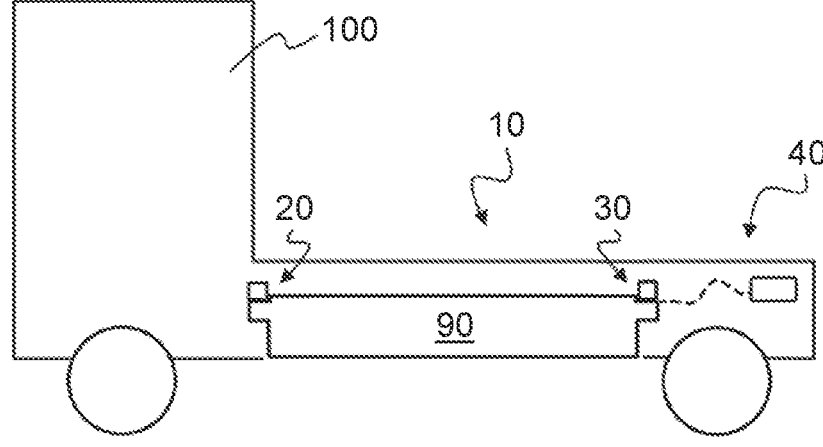
FIG. 1 is an exemplary side view of an electric heavy-duty vehicle according to one example.

FIG. 1 is an exemplary side view of an electric heavy-duty vehicle 100 according to one example, i.e., an electric truck. In FIG. 1, a heavy-duty vehicle battery suspension system 10 for releasably holding a rechargeable traction battery 90 in the electric heavy-duty vehicle 100 is disclosed. The heavy-duty vehicle battery suspension system 10 comprises a pyrotechnical fastener 20, wherein the heavy-duty vehicle battery suspension system 10 is configured to release the traction battery 90 if the pyrotechnical fastener 20 is triggered. In addition, the heavy-duty vehicle battery suspension system 10 is configured such that the pyrotechnical fastener 20 may be manually triggered. Hence, the pyrotechnical fastener 20 may be triggered manually whereby the traction battery 90 may be released from the electric heavy-duty vehicle 100 so that the potential risk from the traction battery 90 may be minimized.

By the expression manually triggered is meant that an operator, i.e., a human being, may trigger the pyrotechnical fastener 20. The present disclosure does not exclude that the heavy-duty vehicle battery suspension system 10 may be configured such that the pyrotechnical fastener 20 may in addition be automatically triggered. The operator that manually triggers the pyrotechnical fastener 20 may typically be a first responder. A first responder may e.g., be a fire fighter, a police officer or paramedics. The operator may also be a mechanic who releases the traction battery e.g., at the garage or when the electric heavy-duty vehicle is being salvaged or towed, so that any risk for the traction battery to ignite or re-ignite is minimized.

The heavy-duty vehicle battery suspension system 10 may also comprise a trigger device 40 for triggering the pyrotechnical fastener 20. The trigger device 40 may be configured to be operated manually by the operator.

In FIG. 1 the heavy-duty vehicle battery suspension system 10 may have a front pyrotechnical fastener 20 and rear pyrotechnical fastener 30 so that the traction battery 90 may be released at every suspension point. Hereby, release of the traction battery 90 may be facilitated.

Figure 2:
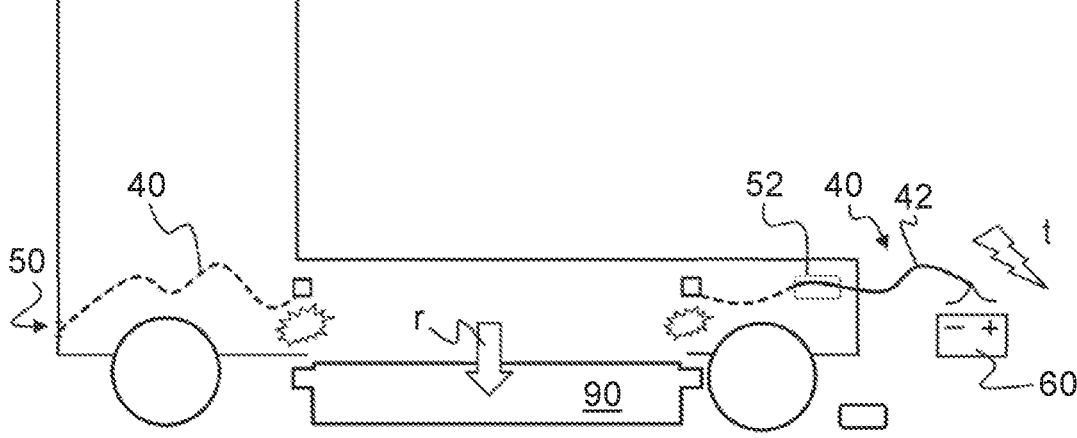
FIG. 2 is an exemplary side view of FIG. 1, wherein the traction battery has been released.

FIG. 2 is an exemplary side view of FIG. 1, wherein the traction battery 90 has been released from the heavy-duty vehicle battery suspension system 10 and from the electric heavy-duty vehicle 100. According to the disclosure, the operator may manually trigger t (indicated by flash in FIG. 2) the trigger device 40 so that the pyrotechnical fasteners may be triggered and thereby the traction battery 90 may be released r (indicated by hollow arrow in FIG. 2). As is illustrated, the heavy-duty vehicle battery suspension system 10 may be configured such that the traction battery 90 may be released onto the ground below the electric heavy-duty vehicle 100.

Furthermore, the trigger device 40 may be configured to trigger the pyrotechnical fastener 20 by an electric potential, for example by an operator connecting an electric cable of the trigger device 40 to an electric energy source 60. The trigger device 40 may first be activated by connecting the electric cable to the electric energy source 60 so that the pyrotechnical fastener may not be unintendedly activated or triggered. The operator may have the electric energy source 60 or the electric energy source 60 may be arranged at an opposite end of the cable compared to the pyrotechnical fastener 20.

The trigger device 40 may be hidden during normal operation of the electric heavy-duty vehicle 100. Hereby, the trigger device 40 may not be visible and it may be avoided that the trigger device 40 be tampered with or damaged somehow. Moreover, it may be ensured that the trigger device 40 may not be activated unintendedly.

Figure 3:
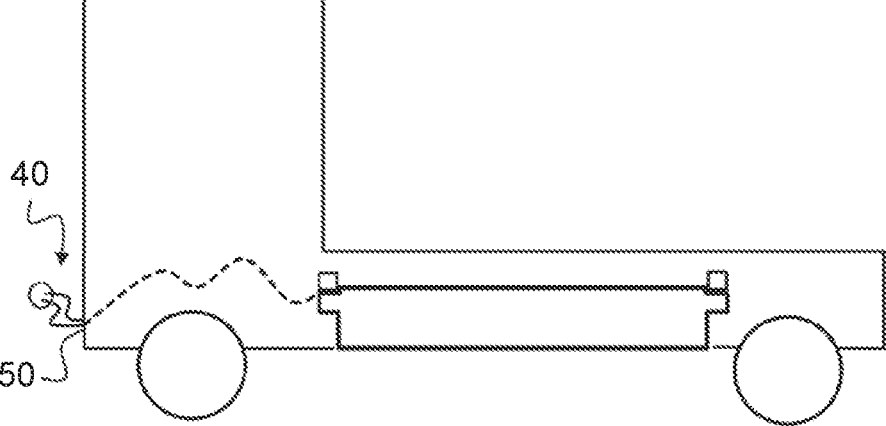
FIG. 3 is an exemplary side view of an electric heavy-duty vehicle according to another example.

In FIG. 2 the trigger device 40 may be accessible to an operator through an opening 50, 52 arranged in the electric heavy-duty vehicle 100. The opening or openings 50, 52 may be configured to be closed during normal operation of the electric heavy-duty vehicle 100. The trigger device 40 may comprise an electric cable 42 being electrically connected to the pyrotechnical fastener. An end of the electric cable 42 may be accessible through the opening 50, 52 as disclosed in FIG. 2 and may protrude from the opening 52 so that the operator may connect the electric cable to the electric energy source 60, and thereby via the electric potential trigger the pyrotechnical fastener. The operator may pull the end of the electric cable out of the opening, as schematically illustrated in FIG. 2. It is to be noted that FIGS. 1 to 3 are schematic exemplary views. The schematically illustrated electric cables are not illustrated as connected to all pyrotechnical fasteners. It is to be apprehended that if there are several pyrotechnical fasteners, the trigger device is configured to trigger all the pyrotechnical fasteners. If one trigger device is accessible through separate openings, or if there are separate trigger devices accessible through separate openings, all pyrotechnical fasteners are triggered when one trigger device is triggered. Thus, in an actual implementation the trigger devices are each connected to each pyrotechnical fastener.

The opening 52 may be a side marking lamp 52 of the electric heavy-duty vehicle 100 so that in the circumstance a proximal end of the electric cable may be electrically connected to the pyrotechnical fastener and a distal end of the electric cable may be accessible to an operator via the side marking lamp 52. Hereby, access to the electric cable and thereby the trigger device 40 may be facilitated, and at the same time that the distal end of the cable may be hidden so that it may be protected and be invisible during normal operation of the electric heavy-duty vehicle 100. In addition, it may be ensured that the distal end of the electric cable may not be activated unintendedly.

Furthermore, the heavy-duty vehicle battery suspension system may comprise at least two separate trigger devices (FIG. 2), each may be configured to independently trigger the pyrotechnical fastener. Hereby, the pyrotechnical fastener may be triggered even in circumstances where one of the trigger devices may not be accessible. In such a circumstance, the other trigger device may be used. Hence, a trigger device redundancy may be obtained providing an increased reliability of the heavy-duty vehicle battery suspension system 10.

FIG. 3 is an exemplary side view of an electric heavy-duty vehicle 100 according to another example. In the disclosure of FIG. 3 the proximal end of the electric cable may be electrically connected to the pyrotechnical fastener and a distal end of the electric cable may be accessible to an operator through an opening in the form of a tow eye opening 50 (as is also schematically illustrated in FIG. 2) of the electric heavy-duty vehicle 100.

Figure 4:
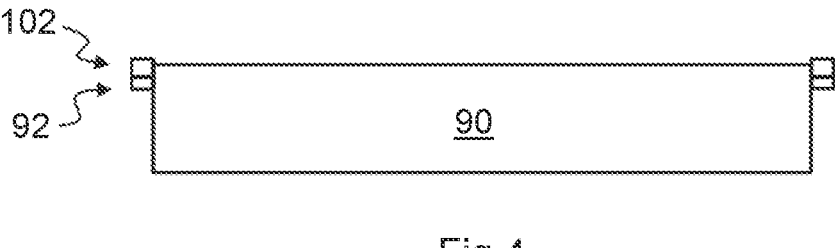
FIG. 4 is an exemplary view of a traction battery, a vehicle fixation bracket and a battery bracket.

FIG. 4 is an exemplary view of a traction battery 90, a vehicle fixation bracket 102 and a battery bracket 92. The heavy-duty vehicle battery suspension system may comprise a number of vehicle fixation brackets and a number of battery brackets so that the traction battery 90 may be properly suspended and held to the electric heavy-duty vehicle.

Figure 5:
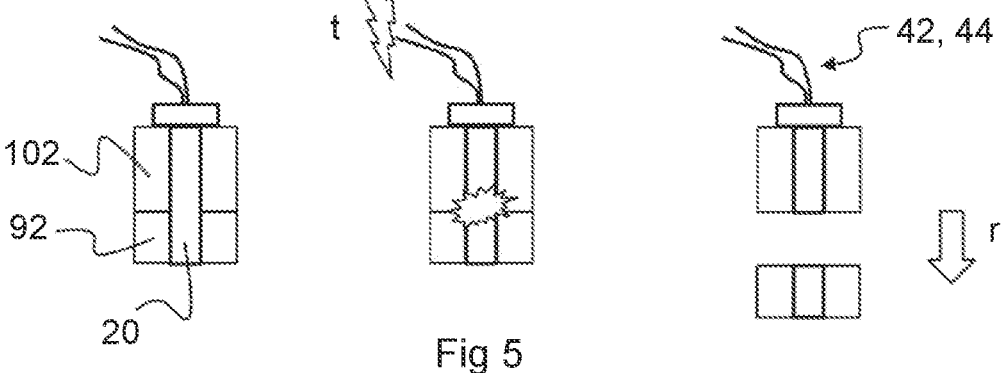
FIG. 5 is an exemplary sequence of triggering a pyrotechnical fastener connecting the vehicle fixation bracket and the battery bracket.

FIG. 5 is an exemplary sequence of triggering a pyrotechnical fastener 20 mechanically connecting the vehicle fixation bracket 102 and the battery bracket 92 is disclosed. The pyrotechnical fastener may extend through the vehicle fixation bracket 102 of the electric heavy-duty vehicle 100 and through the battery bracket 92 of the rechargeable traction battery so that mechanical connection between them is obtained. The electric cables 42, 44 may at the proximal end be electrically connected to the pyrotechnical fastener 20. When the operator manually triggers the trigger device, such as for instance by applying an electrical potential via the electric cables 42, 44 the pyrotechnical fastener may be triggered. The pyrotechnical fastener may comprise a pyrotechnical charge which may be triggered to or activated by the electrical potential, and thereby the charge may break the fastener into two or more parts. Since the pyrotechnical fastener may be divided into several parts by the charge, it will no longer mechanically connect the vehicle fixation bracket 102 and the battery bracket 92 whereby these may be separated and thereby the traction battery 90 may be released r.

Figure 6:
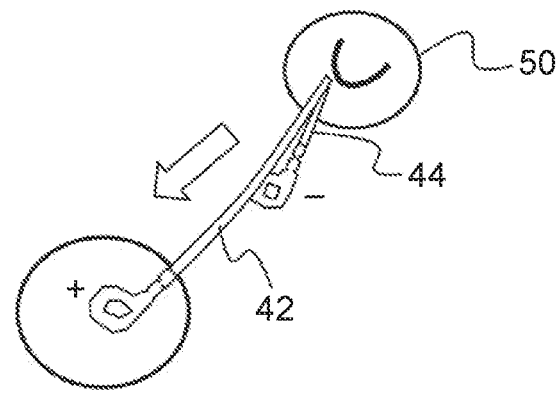
FIG. 6 is an exemplary view of cables protruding from an opening.

FIG. 6 is an exemplary view of the electric cables 42, 44 protruding from the opening 50. The distal ends of the electric cables 42, 44 may be configured to be connected with respective poles of the electric energy source, such as an electric battery.

In addition, a contact member may be arranged between the electric cable and the electric energy source for connecting the electric energy source to the electric cable by activation of the contact member so that the pyrotechnical fastener may be triggered by this activation. Such a contact member may further facilitate a user grasping and pulling the electric cable. Contact members in the form of cable lugs are illustrated in FIG. 6. The electric energy source and the electric cable may then be connected in an easy manner for providing the electric potential to the pyrotechnical fastener.

Furthermore, the traction battery may be held to the electric heavy-duty vehicle at a number of suspension points, and a pyrotechnical fastener may be arranged at each suspension point. Hence, the traction battery may then be released at every suspension point. Hereby, reliable release of the traction battery may be facilitated.

In one example, the heavy-duty vehicle battery suspension system may comprise a front left, a front right, a rear left and a rear right pyrotechnical fastener. Other positions and numbers of the pyrotechnical fastener may be conceivable to the skilled person without departing from the disclosure.

Moreover, a central suspension point may be arranged for holding the traction battery to the electric heavy-duty vehicle, and the pyrotechnical fastener may be arranged in connection with the central suspension point. In addition, a number of suspension points may be connected with the central suspension point.

In one example, the trigger device may comprise a transmitter configured to be activated by an operator for wirelessly communicating with a receiver arranged in connection with the pyrotechnical fastener for triggering the pyrotechnical fastener when the operator activates the transmitter.

According to a second aspect of the disclosure, an electric heavy-duty vehicle energy supply system may comprise the heavy-duty vehicle battery suspension system 10 as mentioned above and a rechargeable traction battery 90.

According to a third aspect of the disclosure, an electric heavy-duty vehicle 100 may comprise a heavy-duty vehicle battery suspension system 10 as mentioned above or an electric heavy-duty vehicle energy supply system as mentioned above.

Example 1: A heavy-duty vehicle battery suspension system (10) for releasably holding a rechargeable traction battery (90) in an electric heavy-duty vehicle (100), wherein the heavy-duty vehicle battery suspension system (10) comprises a pyrotechnical fastener (20), wherein the heavy-duty vehicle battery suspension system (10) is configured to release (r) the traction battery (90) if the pyrotechnical fastener (20) is triggered (t), and wherein the heavy-duty vehicle battery suspension system (10) is configured such that the pyrotechnical fastener (20) may be manually triggered, typically by an operator.

Example 2: The heavy-duty vehicle battery suspension system (10) of example 1 comprising a trigger device (40) for triggering the pyrotechnical fastener (20).

Example 3: The heavy-duty vehicle battery suspension system (10) of example 2, wherein the trigger device (40) is configured to trigger the pyrotechnical fastener (20) by an electric potential, for example by an operator connecting an electric cable (42, 44) of the trigger device (40) to an electric energy source.

Example 4: The heavy-duty vehicle battery suspension system (10) of example 3, wherein a contact member is arranged between the electric cable and the electric energy source for connecting the electric energy source to the electric cable by activation of the contact member so that the pyrotechnical fastener is triggered.

Example 5: The heavy-duty vehicle battery suspension system (10) of example 2, wherein the trigger device (40) comprises an electric cable (42, 44) that is electrically connected to the pyrotechnical fastener (20).

Example 6: The heavy-duty vehicle battery suspension system (10) of example 2, wherein the trigger device (40) is hidden during normal operation of the electric heavy-duty vehicle (100).

Example 7: The heavy-duty vehicle battery suspension system (10) of example 5, wherein a proximal end of the electric cable (42, 44) is electrically connected to the pyrotechnical fastener (20) and a distal end of the electric cable (42, 44) is accessible to an operator through an opening (50, 52) of the electric heavy-duty vehicle (100), wherein said opening (50, 52) is configured to be closed during normal operation of the electric heavy-duty vehicle (100).

Example 8: The heavy-duty vehicle battery suspension system (10) of example 7, wherein a proximal end of the electric cable (42, 44) is electrically connected to the pyrotechnical fastener (20) and a distal end of the electric cable (42, 44) is accessible to an operator through a tow eye opening (50) of the electric heavy-duty vehicle (100).

Example 9: The heavy-duty vehicle battery suspension system (10) of example 7, wherein a proximal end of the electric cable (42, 44) is electrically connected to the pyrotechnical fastener (20) and a distal end of the electric cable (42, 44) is accessible to an operator through a side marking lamp (52) of the electric heavy-duty vehicle (100).

Example 10: The heavy-duty vehicle battery suspension system (10) of example 1, comprising at least two separate trigger devices, each configured to independently trigger the pyrotechnical fastener (20).

Example 11: The heavy-duty vehicle battery suspension system (10) of example 1, wherein the pyrotechnical fastener (20) mechanically connects the rechargeable traction battery (90) to the electric heavy-duty vehicle (100).

Example 12: The heavy-duty vehicle battery suspension system (10) of example 11, wherein the pyrotechnical fastener (20) extends through a vehicle fixation bracket (102) of the electric heavy-duty vehicle (100) and through a battery bracket (92) of the rechargeable traction battery (90).

Example 13: The heavy-duty vehicle battery suspension system (10) of example 1, wherein the traction battery is held to the electric heavy-duty vehicle at a number of suspension points, and wherein a pyrotechnical fastener is arranged at each suspension point.

Example 14: The heavy-duty vehicle battery suspension system (10) of example 1, wherein a central suspension point is arranged for holding the traction battery to the electric heavy-duty vehicle, and wherein a pyrotechnical fastener is arranged in connection with the central suspension point.

Example 15: The heavy-duty vehicle battery suspension system (10) of example 1 comprising a front pyrotechnical fastener (20) and a rear pyrotechnical fastener (30).

Example 16: The heavy-duty vehicle battery suspension system (10) of example 1 comprising a front left, a front right, a rear left and a rear right pyrotechnical fastener.

Example 17: The heavy-duty vehicle battery suspension system (10) of example 2, wherein the trigger device comprises a transmitter configured to be activated by an operator for wirelessly communicating with a receiver arranged in connection with the pyrotechnical fastener for triggering the pyrotechnical fastener.

Example 18: An electric heavy-duty vehicle energy supply system comprising the heavy-duty vehicle battery suspension system (10) of example 1 and a rechargeable traction battery (90).

Example 19: An electric heavy-duty vehicle (100) comprising a heavy-duty vehicle battery suspension system (10) according to example 1 or an electric heavy-duty vehicle energy supply system of example 18.

Example 20: A method for releasing a rechargeable traction battery (90) from an electric heavy-duty vehicle (100), comprising providing a heavy-duty vehicle battery suspension system (10) according to any of examples 1 to 17, arranging a pyrotechnical fastener (20) in the heavy-duty vehicle battery suspension system (10), triggering the pyrotechnical fastener (20) manually for releasing the traction battery (90) from the electric heavy-duty vehicle (100).

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation.

The invention claimed is:

1. A heavy-duty vehicle battery suspension system for releasably holding a rechargeable traction battery in an electric heavy-duty vehicle, wherein:

the heavy-duty vehicle battery suspension system comprises a pyrotechnical fastener and a trigger device configured to trigger the pyrotechnical fastener by an electric potential by an operator connecting an electric cable of the trigger device to an electric energy source, a contact member arranged between the electric cable and the electric energy source for connecting the electric energy source to the electric cable;

the heavy-duty vehicle battery suspension system is configured to release the traction battery if the pyrotechnical fastener is triggered; and the heavy-duty vehicle battery suspension system is configured such that the pyrotechnical fastener may be manually triggered by the operator.

2. The heavy-duty vehicle battery suspension system of claim 1, wherein the trigger device comprises the electric cable that is electrically connected to the pyrotechnical fastener.

3. The heavy-duty vehicle battery suspension system of claim 1, further comprising at least two separate trigger devices, each configured to independently trigger the pyrotechnical fastener.

4. The heavy-duty vehicle battery suspension system of claim 1, wherein the pyrotechnical fastener mechanically connects the rechargeable traction battery to the electric heavy-duty vehicle.

5. The heavy-duty vehicle battery suspension system of claim 4, wherein the pyrotechnical fastener extends through a vehicle fixation bracket of the electric heavy-duty vehicle and through a battery bracket of the rechargeable traction battery.

6. The heavy-duty vehicle battery suspension system of claim 1, wherein the traction battery is held to the electric heavy-duty vehicle at a number of suspension points, and wherein the pyrotechnical fastener is one of a plurality of pyrotechnical fasteners arranged at each suspension point.

7. The heavy-duty vehicle battery suspension system of claim 1, wherein a central suspension point is arranged for holding the traction battery to the electric heavy-duty vehicle, and wherein the pyrotechnical fastener is arranged in connection with the central suspension point.

8. The heavy-duty vehicle battery suspension system of claim 1, wherein the pyrotechnical fastener is a front pyrotechnical fastener, and further comprising a rear pyrotechnical fastener.

9. The heavy-duty vehicle battery suspension system of claim 1, wherein the trigger device comprises a transmitter configured to be activated by the operator for wirelessly communicating with a receiver arranged in connection with the pyrotechnical fastener for triggering the pyrotechnical fastener.

10. The heavy-duty vehicle battery suspension system of claim 1, wherein the pyrotechnical fastener is one of a front left, a front right, a rear left, and a rear right pyrotechnical fastener.

11. An electric heavy-duty vehicle energy supply system comprising the heavy-duty vehicle battery suspension system of claim 1 and the rechargeable traction battery.

12. A method for releasing the rechargeable traction battery from the electric heavy-duty vehicle, comprising:
   providing the heavy-duty vehicle battery suspension system of claim 1;
   arranging the pyrotechnical fastener in the heavy-duty vehicle battery suspension system; and
   triggering the pyrotechnical fastener manually for releasing the traction battery from the electric heavy-duty vehicle.

13. A heavy-duty vehicle battery suspension system for releasably holding a rechargeable traction battery in an electric heavy-duty vehicle, wherein:
   the heavy-duty vehicle battery suspension system comprises a pyrotechnical fastener and a trigger device for triggering the pyrotechnical fastener, the trigger device being hidden during normal operation of the electric heavy-duty vehicle;

the heavy-duty vehicle battery suspension system is configured to release the traction battery if the pyrotechnical fastener is triggered; and
   the heavy-duty vehicle battery suspension system is configured such that the pyrotechnical fastener may be manually triggered by an operator.

14. The heavy-duty vehicle battery suspension system of claim 13, wherein a proximal end of an electric cable is electrically connected to the pyrotechnical fastener and a distal end of the electric cable is accessible to the operator through an opening of the electric heavy-duty vehicle, wherein the opening is configured to be closed during normal operation of the electric heavy-duty vehicle.

15. The heavy-duty vehicle battery suspension system of claim 14, wherein the proximal end of the electric cable is electrically connected to the pyrotechnical fastener and the distal end of the electric cable is accessible to the operator through a tow eye opening of the electric heavy-duty vehicle that serves as the opening of the electric heavy-duty vehicle.

16. The heavy-duty vehicle battery suspension system of claim 14, wherein the proximal end of the electric cable is electrically connected to the pyrotechnical fastener and the distal end of the electric cable is accessible to the operator through a side marking lamp of the electric heavy-duty vehicle that serves as the opening of the electric heavy-duty vehicle.

17. An electric heavy-duty vehicle comprising:
   a heavy-duty vehicle battery suspension system for releasably holding a rechargeable traction battery in the electric heavy-duty vehicle, wherein:
   the heavy-duty vehicle battery suspension system comprises a pyrotechnical fastener and a trigger device configured to trigger the pyrotechnical fastener by an electric potential by an operator connecting an electric cable of the trigger device to an electric energy source, a contact member arranged between the electric cable and the electric energy source for connecting the electric energy source to the electric cable;
   the heavy-duty vehicle battery suspension system is configured to release the traction battery if the pyrotechnical fastener is triggered; and
   the heavy-duty vehicle battery suspension system is configured such that the pyrotechnical fastener may be manually triggered by the operator; and
   an electric heavy-duty vehicle energy supply system comprising the heavy-duty vehicle battery suspension system and the rechargeable traction battery.

* * * * *